United States Patent [19]
Fenn et al.

[11] Patent Number: 4,588,873
[45] Date of Patent: May 13, 1986

[54] ULTRASONIC CONTROL OF WELDING

[75] Inventors: Robert Fenn, High Wycombe; Raymond R. Stroud, Bracknell, both of England

[73] Assignee: National Research Development Corp., London, England

[21] Appl. No.: 540,772

[22] Filed: Oct. 7, 1983

[30] Foreign Application Priority Data

Nov. 17, 1982 [GB] United Kingdom ............... 8232829

[51] Int. Cl.$^4$ .............................................. B23K 9/10
[52] U.S. Cl. ............................... 219/124.34; 73/598; 219/130.21; 219/137.71
[58] Field of Search ................. 219/124.34, 130.21, 219/109, 137.71; 73/598

[56] References Cited

U.S. PATENT DOCUMENTS 3,484,667 12/1969 Wofsey.
3,726,130 4/1973 Hurlebaus ........................ 219/109

FOREIGN PATENT DOCUMENTS

| 0064454 | 4/1982 | European Pat. Off. . | |
| 1905302 | 8/1970 | Fed. Rep. of Germany | 219/124.34 |
| 3127159 | 4/1982 | Fed. Rep. of Germany . | |
| 55-133880 | 10/1980 | Japan | 219/124.34 |
| 1285715 | 8/1972 | United Kingdom . | |
| 1555799 | 11/1979 | United Kingdom . | |
| 1603380 | 11/1981 | United Kingdom . | |

OTHER PUBLICATIONS

L. A. Lott, "Ultrasonic Detection of Molten/Solid Interfaces of Weld Pools", *Materials Evaluation*, 3/1984, pp. 337-341.

Jose Converti et al., "Improvement of Reliability of Welding by In-Process Sensing and Control (Development of Smart Welding Machines for Girth Welding of Pipes)", MIT Industrial Liaison Program Report, Oct. 28, 1981, pp. 56 and 57.

Thomas R. Moebus, "Automated Welding Research At MIT", MIT Industrial Liaison Program, Oct. 1981, pp. 1 and 2.

Joel M. Katz, "Ultrasonic Measurement and Control of Weld Penetration", Massachusetts Institute of Technology Archives, Jul. 30, 1980, pp. 1-147.

Idaho National Engineering Laboratory (INEL) Jan. 7, 1982, "Molten Pool Sensing for Automated Welding System".

Professor Hardt of MIT, Oct. 28, 1981, "Closed-Loop Weld Geometry Control" Automated Welding Research.

Fenn and Stroud, "The Measurement and Control of Penetration During Submerged-Arc Welding", pp. 1-5, Nov. 17, 1982, Department of Metallurgy, Brunel University.

*Primary Examiner*—Clifford C. Shaw
*Attorney, Agent, or Firm*—Cushman, Darby & Cushman

[57] ABSTRACT

A method of automatically controlling the production of a weld bead including examining with reflected ultrasound from one surface of a piece of material the position of a weld pool on the material and the position of another surface of the material, and controlling the position of the weld bead on the material from the result of said examination.

14 Claims, 5 Drawing Figures

ULTRASONIC CONTROL OF WELDING

This invention relates to the control of welding and more particularly to the control of welding using information derived by ultrasonic sounding in material while welding takes place.

It has been proposed to sense the molten metal weld pool by using ultrasonic radiation. For example Idaho National Engineering Laboratory (INEL) on Jan. 7th, 1982 announced a technique in which a transducer coupled through water to a metal plate sensed the distance of the weld pool from the opposite surface of the plate. INEL suggested that this could be the basis of an automated system to make corrections in process variables while the weld pool is still being formed. Professor Hardt of MIT has also reported, Oct. 28th, 1981, work of this nature.

In a paper by Fenn and Stroud "The measurement and control of penetration during submerged-arc welding" a more advanced state of welding control is described in which ultrasonic echoes from two ultrasonic transducers on the front surface of the plates to be welded are used. The transducers are positioned behind the welding electrode, one on each side and directed towards each other across the weld but downwards into the metal. The ultrasonic energy beam is reflected off the weld pool area to permit the beam path length to be measured and variations in the value of this length were used to control welding current and wire feed to achieve a desired length. Closed-loop operation in real-time was achieved to produce welds in metal plates half inch (12 mm) and more in thickness.

However these arrangements use only the beam path length from a point as a control value.

It is an object of the invention to provide a method and apparatus to control the position of a weld bead with respect to the shape of the material to which the bead is applied.

The invention provides automatic control of the production of a weld bead by examining with reflected ultrasound from one surfce of a piece of material the position of a weld pool and another surface of the material and controlling the position of the weld bead from the result of said examination.

The examination provides information on both beam path length and direction for use as control values.

This is suitable for the first bead of several or the only bead if one is enough and enables the position of the weld pool to be controlled with respect to rear surface of the metal being welded to ensure the correct bead shape when the rear surface is penetrated by the bead.

According to the invention there is provided a method of controlling the production of a weld bead on a piece of material, the method including providing a welding apparatus controllable to follow a path in response to a control signal to produce a weld bead along said path, propagating ultrasound in the material for reflection in accordance with the form of the material and the weld bead, picking-up respective ultrasound signals after said reflection, providing output signals therefrom, responding to said output signals to determine the position of the weld bead with respect to the form of the piece of material, providing from said determination a signal indicative of said bead position, and applying said bead position indicating signal as at least part of the control signal for the welding apparatus to cause the apparatus to follow a path and product a required weld bead penetration with respect to the form of the piece of material.

The form of the piece of material used to determine position may be front and bottom surface corners of an edge of the material to which the weld bead is to be applied. There may be two pieces of material to be welded together by the bead. The ultrasound may be shear (transverse) waves.

The method may include controlling the depth of penetration of the first or a single weld bead through the rear surface of material to be welded.

According to the invention there is provided an arrangement to control the position at which a weld bead is deposited on material, the arrangement including means to propagate ultrasound down into a material from a surface thereof, means to pick-up ultrasound reflections and produce a signal representative of said picked-up reflections, means to gate said signal to select signal elements for reflections from extremities of the material and reflections representing the weld bead, means to assess said selected signal elements to determine the relative position of the bead and the extremities and produce a position signal indicative of said relative position and means responsive to said position signal to control the position at which the weld bead is deposited.

The arrangement may control the current of an arc welding process.

The arrangement may control the weld bead both in depth and laterally of the weld position.

The arrangement may be an automatic seam-following welding controller.

Embodiments of the apparatus will now be described with reference to the accompanying drawings in which.

Figure 1:
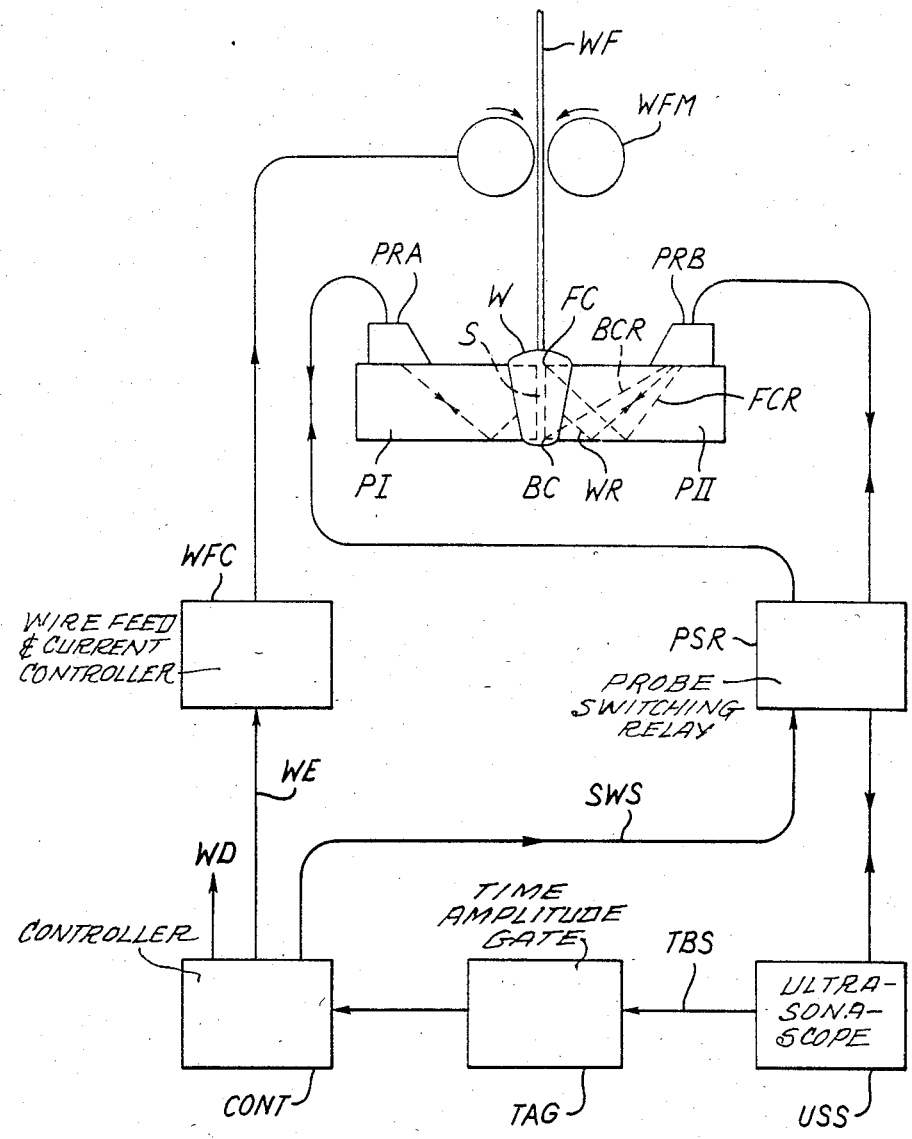
FIG. 1 is a block diagram of a control apparatus embodying the invention.

FIG. 1 shows a block schematic diagram of a welding control apparatus which is arranged to control the feed of weld wire, or other welding action, from a welding head and the movement of the welding head along a seam in the direction of arrow AW. The general form of such apparatus is well known and will not be described further. A submerged-arc welder was used in the work to be described.

In the Figure the pieces of material to be welded, e.g. two pieces of steel, are identified at PI and PII. Preferably the parts have the areas to be welded prepared in a suitable way, e.g. square cut or profiled according to thickness. Each piece will then have a front corner FC and a bottom corner BC extending along a seam S where a weld W is to be formed. The pieces are typically 25 mm thick or thicker, although smaller thicknesses, down to 12 mm can be used.

Figure 2:
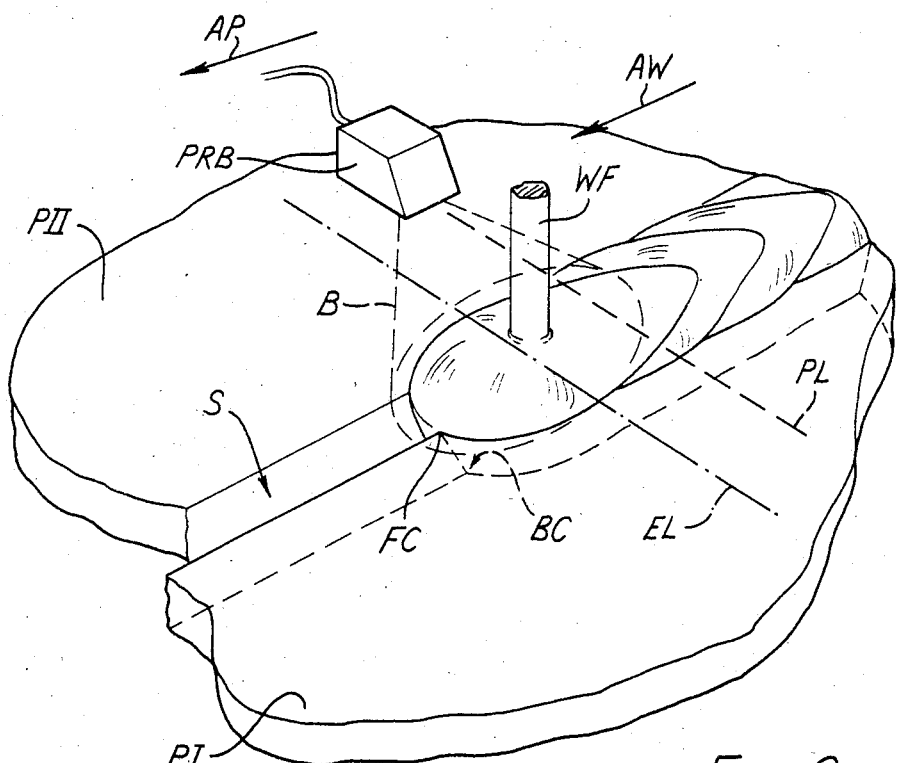
FIG. 2 is a diagram of the propagation and reflection of ultrasound in a welding operation according to the invention.

The control apparatus includes two ultrasonic transducer probes PRA and PRB which can propagate and pick-up ultrasound within the pieces of material PI, PII. A combined source and receiver of ultrasound is indicated at USS. This is conveniently an ultrasonascope which produces an output signal derived from the picked-up sound and supplies it to a gate TAG. As two probes are used it is simplest to energise these in turn via a probe switching relay PSR under the control of a switching signal SWS. The probes are arranged as indicated in FIG. 2, which for clarity shows only probe PRB. Specific forms of probe arrangement are described below. The two probes are supported to move forward as indicated by arrow AP in ultrasound transducing contact with the material and are positioned on a line PL transverse to the seam S and a short distance behind the welding position indicated by the weld wire feed WF and electrode line EL. Each probe produces a spreading beam of ultrasound B and the probes are positioned to direct this beam down and towards the seam S, as indicated by the lines FCR, WR and BCR in FIG. 1. These lines are only intended to indicate the general direction of the beam B and relfected ultrasound which are of interest. The spread of the beam B is such that despite the positioning of the probes behind the welding position on line EL the whole area from in front of the weld to behind it is insonified, as shown in FIG. 2 (the ultrasound is propagated in the shear or transverse mode in pulses).

It has been found that three important reflections of ultrasound occur in the above described arrangement. These are from the front corner, FC, the bottom corner, BC, and the weld, W, and the respective reflections are identified at FCR, BCR and WR. All three reflections can be identified during welding as the spread of the beam is great enough. These three reflections produce signals from which the relative position of the weld and the pieces of material, and the penetration of the weld bead, can be determined. It is helpful if the signals and the system are calibrated before use e.g. by using standard test block such as an A2 11W, or a DIN 54-122 for shearwaves. The frequency of the ultrasound does not appear to be critical. At 1 MHz there is less attenuation but poorer resolution and more side wall and other stray echoes while at 2 MHz to 2.5 MHz the resolution is better with less sidewall effect although the attenuation is worse. On balance frequencies of 2.25 MHz and 2.5 MHz proved more suitable but other values are clearly suitable and even higher values can be effective.

The reflections pass through the switch PSR to the ultrasonascope USS to produce a time based output signal TBS with, generally, the bottom corner signal element occurring before the weld signal element which is in turn before the front corner element. Some noise and random reflection is of course present although this is reduced by the higher absorption in the heated zone. The gate TAG acts to select signals of more than a certain amplitude occurring at a set time, or times, after a pulse of ultrasound into the material. Signals from each probe in turn are examined in gate TAG at a frequent enough rate to permit the determination of the position of the weld and the penetration of the bead. As the positions of the front and back corners about to be welded are known for both sides of the seam and the position of the weld seam can also be determined with respect to these positions it is possible to check whether or not the welding head is moving along the seam or drifting off while the coincidence of the weld bead with the seam is also demonstrated. These checks are carried out in a controller CONT to produce two outputs. One output, WE, acts on a weld feed controller WFC to regulate the weld wire feed and weld current to provide the required weld penetration while the other, WD, controls the transverse part of the weld head drive to keep it on the seam line. Details of these operations are not given here as with the control signals provided by the invention it is within the ability of one skilled in the art to produce suitable equipment for this purpose. The actual values of weld speed and current are of course dependent on material and other factors and can be readily determined by skilled users but weld currents of 250 A to 800 A are within the control range of equipment according to the invention.

The response speed of the control loop must be related to the material and the welding technique. Rapidly cooling metals such as aluminium, and smaller weld pool techniques, such as MIG, require faster response from current control and position control.

The actual speed of response was assessed when a microcomputer was programmed to carry out the control action of controller CONT, adjusting the speed of the weld wire feed motor (not shown) to adjust weld current. As weld current affects weld pool size and therefore penetration this is a convenient control action to use to give overall control. The microcomputer had stored values for path length for required weld penetration on a given piece of material and compared the stored values with the actual values indicated by the ultrasound reflections to generate a correction control signal not to achieve required weld penetration. As the weld depth signal is reflected from the back of the material in the specific embodiment an increase in signal path indicated too shallow a weld. The weld current value could also be set into the controller and by varying the current slowly the weld penetration varies smoothly in dependence, even over a range of 250 A to 800 A and back again. (250 A was the minimum arc current level.) The speed of response was assessed by step changes of current typically 800 A to 250 A to 400 A to 800 A. The response time of the weld puddle is measured in seconds, say 1 to 3 seconds at such currents, but the control system responded to the instruction to change current in times measured in milliseconds, that is much faster than the weld puddle. The actual weld reflects the current step and records of the beam path lengths show that these detect the effects of the current step.

A limiting factor in speed of response might be the power supply if more rapid response is required, say for gas-metal arc welding or gas-tungsten arc welding or for metals other than steel, say aluminium. Ultrasound signals propagate in aluminum in a similar manner to that in steel. Faster computation of control information is also possible if required.

Instead of using only two transducers three of four may be used to derive the information described above.

If the weld bead is being laid down to augment a bead already laid, or possibly to not penetrate the full depth of the seam space between plates, then the bottom corner reflection may appear in a different form. However the modifications needed, if any, to the control arrangement will be readily apparent having regard to the description herein.

Figure 3:
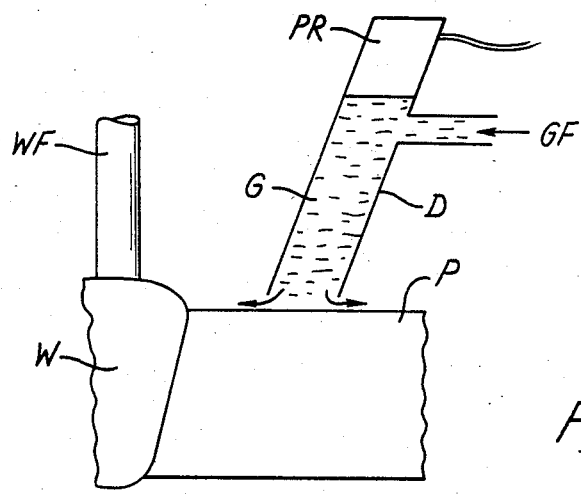
FIGS. 3, 4 and 5 show in outline ultrasound transducer coupling arrangements useful for the performance of the invention.

The need for good transducer contact will be apparent. Also the area near the weld is very hot and harmful to transducers. FIG. 3 shows a transducer set up to mitigate this problem. A transducer PR is mounted on top of a duct D, which may be obliquely inclined. Duct D is supplied with a gel G pumped through a gel feed GF. The gel G is suitable to couple ultrasound from transducer PR to material P and can escape round the lower end of duct D as the whole assembly moves along. In this way the transducer can be spaced from the heat of welding while maintaining good ultrasonic conduction. The gel must be able to withstand the temperature in the area and is conveniently a thixotropic material. A suitable gel could be formed by a suspension of fine clay particles in a liquid. Other materials are of course possible. The material may be allowed to flow to waste as indicated by the arrows.

Figure 4:
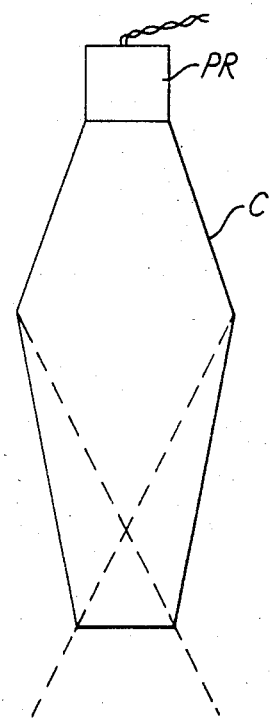

FIG. 4 shows an example of another form of coupling between a transducer and the material while providing thermal isolation. In this form of coupling the transducer PR is mounted on a column C of rigid material which acts as a waveguide to contain the ultrasound from the transducer and transfer it to the material being welded. The column can be parallel-sided and of circular cross-section larger than the transducer aperture. The length is chosen so the diverging beam is reflected in the column to converge and then diverge as it leaves the column. Conveniently the length is such that the diverging beam has same the size as the transducer aperture as it leaves the column. The column is coupled to the material surface of a film of gel. The column can be of metal, say steel or aluminum or of a plastics material, such as PERSPEX (RTM), so long as good ultrasound transmission is obtained. The column is long enough to provide thermal isolation of the transducer PR.

The column C shown in FIG. 4 is a shaped solid body to act as a coupled waveguide. The shape matches the spread of the beam until reflection and then convergence to emerge as a diverging beam as shown by the dotted lines. This shaped form reduces stray reflections. Again the column is coupled to the material by a gel. The column can be square to the surface, or inclined if preferred.

Instead of a solid waveguide a conventional "horn" waveguide may be used, with the transducer at the small end of the horn and the large open end applied to the material. A pick-up transducer may be mounted at the open end to be coupled to the material and receive reflection signals. The horn may be air filled for normal use but could be water filled, particularly for underwater use. The transducer at the small end may be both transmitter and receiver. This arrangement avoids the need for "consumables" such as gel or other lubricant and is suitable for "clean" areas even though the efficiency is reduced.

Figure 5:
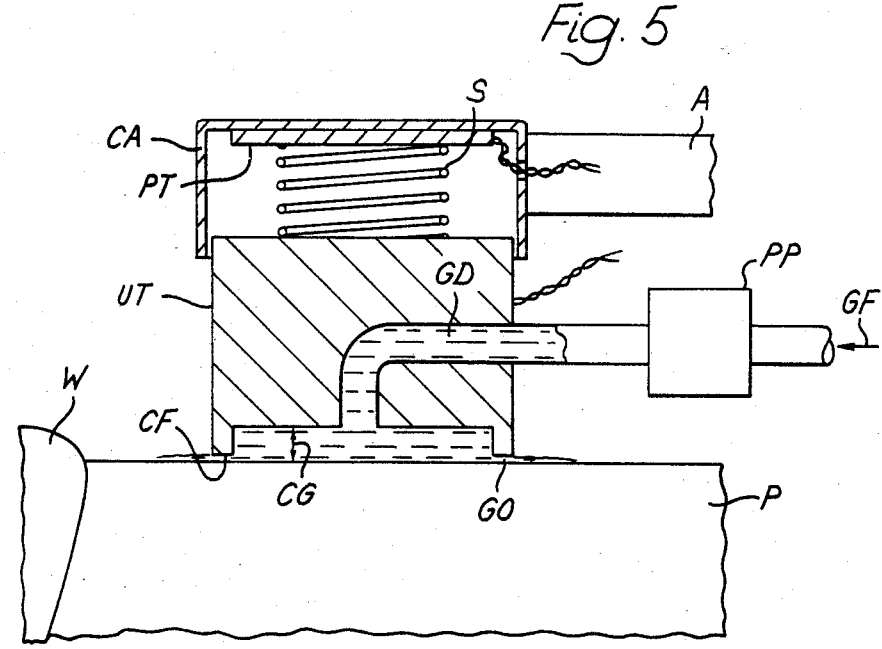

FIG. 5 shows an arrangement for the coupling gel or other medium at the interface of the probe (and column) with the material to maintain constant coupling. Optimum transfer into the material occurs with a spacing between the probe (or column) and material surface of an odd number of half wavelengths. At the frequencies in use (say 2 to 3 MHz) this spacing is a multiple of about 0.25 mm, a half wavelength. In FIG. 5 in ultrasonic transducer UT, which may be both transmitter and receiver, is shown in outline. The coupling face CF is in the form of a rim around a recess. The recess forms a coupling gap CG about 0.25 mn across. A gel duct GD is formed in the body of transducer UT to convey gel to the coupling face and its recess. The gel is pumped by a pump PP, which may be of the peristaltic type from a feed GF. In operation the pressure in the gel in duct GD lifts the transducer slightly from the surface of a piece of material P to produce a small gap GO beneath the rim of face CF. The gel escapes through the gap GO to lubricate and cool the movement of the transducer over the material P. The transducer UT is supported in a cap CA on an arm A and a spring S housed in cap CA exerts a pressure between the cap and transducer to determine, in combination with the pressure of the gel, the gap GO. A further transducer PT monitors the spring S to control the pump PP and maintain a constant coupling gap. The loss through gap GO is small as the gap is about one-tenth the coupling gap, just enough to avoid contact between the rim and the material P. This arrangement can be used with the devices described above.

Another form of coupling of the ultrasonic energy may be through contact by a rolling element such as a ball or disc or roller. The rolling element could be of rigid material, e.g. metal, or softer e.g. silicon rubber.

The use of transverse or shear waves has an advantage over longitudinal, or compressive, waves in that although the latter waves have lower attenuation with distance and temperature they can, less usefully, provide reflections from within the weld bead which confuse the assessment of weld position. The launching of waves from the front surface is clearly an advantage but this is not all. Hitherto, penetration depth has been assessed from the back surface by insonification through a water coupling. While this is safe and effective when the weld bead does not penetrate to the back surface it can not be used where the bead does penetrate, which is a more usual practical situation. Accordingly the provision, by the present invention, of a technique which, with insonification from the front surface, can produce real-time information about weld shape and penetration right through a material is a significant advance. The technique is usable with various shielded welding processes including submerged-arc, using a flux powder, and gas shielded welding, using an inert gas, as well as other welding processes. Welding processes for materials other than metal, e.g. plastics, may be controlled by embodiments of the invention. The techniques are particularly important for plates thicker than 12 mm (half inch) and for non-repetitive welding as the arrangement can be caused to follow a weld seamline without detailed prior knowledge of the path of the seam line and produce a consistent weld standard without the variation in skill of a human welder, particularly in awkward weld configurations affecting the weld quality. Ultrasonic surface waves could be used to provide information for seam tracking by examining reflections from the seam edge. This is especially suitable for thin material, e.g. less than 15 mm thick.

The weld bead may be deposited over a path wider than the bead by causing the welding head to weave from side-to-side while moving along the path. In this way a gap may be filled and variable width of a seam coped with by varying the "weave" action. The weld bead may be caused to weave by electromagnetic means, e.g. four electromagnets arranged around an arc.

The use of a time-based assessment is also very helpful in discriminating against spurious signals as opposed to earlier techniques relying only on amplitude. It has also been found that useful signals can be provided by the off-axis part of the spreading beam of ultrasound even at the parts where the beam energy is a small fraction of the peak axial intensity. Clearly more transducers of combined send/receive or individual send or receive types may be used but the above arrangement using two provides a good compromise having regard to the need for consistent ultrasound transducing contact. Various materials may be used for the coupling gel for example a cellulosic thixotropic gel, which may be based on methyl cellulose.

The techniques described above provide the ability to control weld penetration with reference to the form of the material on which the weld bead is deposited. This permits the production of a weld with consistent and good performance.

In particular reliable control of penetration depth permits deeper penetration during a pass which results in increased dilution, and thus chemical homogeniety, fewer passes for a given weld, yielding coarser grain size, the complete penetration through the material, with better fatigue performance, without risk of excessive penetration.

We claim:

1. Method of automatically controlling the production of a weld bead including examining with reflected ultrasound from one surface in a piece of material the actual position of a weld pool on the material and the actual position of another surface of the material, and directly controlling the position of the weld bead produced on the material from the result of said examination.

2. A method according to claim 1 in which the another surface is opposite said one surface and the penetration of the weld bead from the one toward the another surface is the position controlled.

3. A method according to claim 2 in which the ultrasound is shear waves.

4. A method according to claim 2 including examining with reflected ultrasound the edges of a surface of the material in a weld seam and the penetration of a weld pool into the seam.

5. A method according to claim 1 in which the another surface is at an angle to the one surface and forms a seam with a further surface and the filling of the seam by the weld beak is the position controlled.

6. A method according to claim 5 in which the ultrasound is surface waves.

7. An arrangement to control the position at which a weld bead is deposited on material, the arrangement including means to propagate ultrasound into a material from a surface thereof, means to pick-up ultrasound reflections and produce a signal representative of said picked-up reflections, means to gate said signal to select signal elements for reflections from extremities of the material and reflections representing the weld bead, means to assess said selected signal elements to determine the actual relative position of the bead and the extremities and produce a position signal indicative of said relative position and means responsive to said position relative to the extremities signal to control the position at which the weld bead is deposited.

8. An arrangement according to claim 7 including means to control the position of the weld bead at least in part by controlling the weld current in an arc welding process.

9. An arrangement according to claim 7 including means to control the penetration of the weld bead into the material.

10. An arrangement according to claim 7 including means to automatically follow a seam between pieces of material and means to deposit a weld bead to join the pieces along the seam.

11. A method of controlling the production of a weld bead on a piece of material, the method including providing a welding apparatus controllable to follow a path in response to a control signal to produce a weld bead along said path, propagating ultrasound in the material for reflection in accordance with the form of the material and the liquid weld bead, picking-up respective ultrasound signals after said reflection, providing output signals therefrom, responding to said output signals to determine the position of the still-liquid weld bead with respect to the adjacent actual form of the piece of material, providing from said determination a signal indicative of said bead position, and applying said bead position indicating signal as at least part of the control signal for the welding apparatus to cause the apparatus to follow a path and product a required weld bead penetration with respect to the actual form of the piece of material.

12. A method according to claim 11 in which response is made to signals from front and bottom surface corners of an edge of the piece of material where the weld bead is to be applied.

13. A method according to claim 12 of providing a weld bead between two pieces of material.

14. A method according to claim 11 including controlling the penetration of a weld bead to limit projection thereof beyond the rear surface of a piece of material.

* * * * *